United States Patent
McLaughlin et al.

(10) Patent No.: US 9,176,942 B1
(45) Date of Patent: Nov. 3, 2015

(54) SYSTEM AND METHOD FOR SYNCHRONIZING AND EDITING ELECTRONIC DOCUMENTS

(71) Applicant: Realquidity Corp., San Carlos, CA (US)

(72) Inventors: Quinn Michael McLaughlin, Santa Cruz, CA (US); Shawn Aubrey Silk, Burlingame, CA (US); Harris Krumwiede Ross, San Carlos, CA (US)

(73) Assignee: Realquidity Corp., San Carlos, CA (US)

( * ) Notice: Subject to any disclaimer, the term of this patent is extended or adjusted under 35 U.S.C. 154(b) by 0 days.

(21) Appl. No.: 14/462,353

(22) Filed: Aug. 18, 2014

Related U.S. Application Data

(60) Provisional application No. 61/969,745, filed on Mar. 24, 2014.

(51) Int. Cl.
  *G06F 21/00* (2013.01)
  *G06F 17/24* (2006.01)
  *G06F 21/36* (2013.01)

(52) U.S. Cl.
  CPC ............... *G06F 17/24* (2013.01); *G06F 21/36* (2013.01)

(58) Field of Classification Search
  CPC .................................. G06F 17/24; G06F 21/36
  USPC ........................................................ 713/186
  See application file for complete search history.

(56) References Cited

U.S. PATENT DOCUMENTS

| | | | |
|---|---|---|---|
| 6,882,859 B1 | 4/2005 | Rao et al. | |
| 7,916,906 B2 | 3/2011 | Hicks et al. | |
| 8,065,527 B2 | 11/2011 | Veluchamy et al. | |
| 8,370,632 B2 | 2/2013 | Lehwany | |
| 8,588,483 B2 | 11/2013 | Hicks et al. | |
| 2007/0277042 A1 | 11/2007 | Dietl | |
| 2011/0185184 A1 | 7/2011 | Guenther | |
| 2012/0192250 A1 | 7/2012 | Rakan | |
| 2012/0303962 A1 | 11/2012 | Ghani et al. | |
| 2013/0137488 A1* | 5/2013 | Rao et al. | 455/566 |
| 2013/0159720 A1 | 6/2013 | Gonser et al. | |
| 2013/0212397 A1 | 8/2013 | Lehwany | |
| 2013/0215078 A1* | 8/2013 | Bodnar et al. | 345/174 |
| 2013/0262992 A1* | 10/2013 | He et al. | 715/255 |
| 2014/0002380 A1 | 1/2014 | Xiao-Guang Li et al. | |
| 2014/0089518 A1 | 3/2014 | Zhang et al. | |

FOREIGN PATENT DOCUMENTS

| | | |
|---|---|---|
| WO | WO-2014047871 | 4/2014 |
| WO | WO-2014089518 | 6/2014 |

\* cited by examiner

*Primary Examiner* — Mohammad W Reza
(74) *Attorney, Agent, or Firm* — Marcus T. Hunt

(57) ABSTRACT

Embodiments described herein include a system and method for editing one or more electronic documents synchronized among multiple electronic devices. The electronic devices may include mobile devices having a touch screen display to capture the edits to the electronic document. Edits to the electronic document can be received and updated in real time on all synchronized devices. In one embodiment, the edits to the electronic document include a handwritten signature from a signer of the electronic document. The handwritten signature is concurrently viewable in each display of the synchronized mobile devices in real time to simulate a real-world experience of signing a paper document with several witnesses. Additional multifactor authentication data can be associated with the handwritten signature data for security and authentication purposes.

18 Claims, 8 Drawing Sheets

SYSTEM AND METHOD FOR SYNCHRONIZING AND EDITING ELECTRONIC DOCUMENTS

PRIORITY

The present patent application claims priority to and incorporates by reference the corresponding provisional patent application No. 61/969,745, entitled, "Methods and Systems for Synchronizing With and Editing Electronic Documents" filed on Mar. 24, 2014.

FIELD OF THE INVENTION

At least certain embodiments of the invention relate generally to editing electronic documents, and more particularly to synchronizing and editing electronic documents among two or more data processing devices.

BACKGROUND OF THE INVENTION

Signatures have been used for centuries to notarize and authenticate documents. A person's handwritten signature can give evidence of the provenance of a document as well as the intention of the person with regard to that document. For example, the role of a signature in many consumer contracts is not solely to provide evidence of the identity of the contracting party, but rather to additionally provide evidence of deliberation and informed consent. The unique properties of a person's signature have enabled their use as a legally binding indication that a signing individual, or signatory, understands and consents to documents containing their signature. Historically, signatures have also proven useful to thwart attempts at forgery. Even studious endeavors to write another's signature can often be detected by the trained eye.

With the ushering in of the digital age, a replacement for a person's handwritten signature has long been sought. However, despite the ability to transmit information over great distances with relative ease, an electronic substitute for the signature has been slow in coming. Conventionally, obtaining signatures on electronic documents has been a cumbersome and time-consuming process. For instance, to obtain a signature on an electronic document required an individual to print out the electronic document, sign it, and then scan the document back into electronic form. This wastes valuable time and resources and requires use of several electronic devices including a computer, a printer, and a scanner.

While many attempts have been made to create a digital equivalent for the signature, the written signature has proven difficult to replace. A comparable equivalent has not been found that includes a signature's unique ability to connect a person's intent and identity with a document upon which their signature is placed. There have been many attempts made by government, legal, and industry groups to create legally binding, digital equivalents of the written signature, but despite this, many industries have been slow to adopt such efforts. The lack of an adequate replacement for a hand-written signature tends to reduce the amount of business and legal work that can be accomplished between remote locations.

SUMMARY

A system and method is described herein for editing one or more electronic documents synchronized among multiple electronic devices. The electronic devices may include mobile devices having a touch screen display to capture edits to the electronic document. Edits to the electronic document can be received and updated in real time in the displays on all synchronized devices. In one embodiment, the edits to the electronic document include a handwritten signature from a signer of the electronic document. The handwritten signature is concurrently viewable in each display of the synchronized mobile devices in real time to simulate a real-world experience of signing a paper document with multiple witnesses.

Edits to the electronic document made at a first device can be reflected in real time in a display of the electronic document on a second device and edits to the electronic document on the second device can be reflected in real time in a display of the first device. In addition, the electronic document can be merged across the first and second devices to permit different pages of the electronic document to be viewed and edited concurrently in the displays of the first and second devices.

Additional multifactor authentication data can be associated with the handwritten signature data for security and authentication purposes. Mobile devices include common functionality such as an associated telephone number and a geolocation unit such as a Global Positioning System ("GPS"). This functionality can be leveraged to provide enhanced security and to authenticate the edits from users of the system.

BRIEF DESCRIPTION OF THE DRAWINGS

For a better understanding of at least certain embodiments, reference will be made to the following Detailed Description, which is to be read in conjunction with the accompanying drawings, wherein.

DETAILED DESCRIPTION

Figure 1:
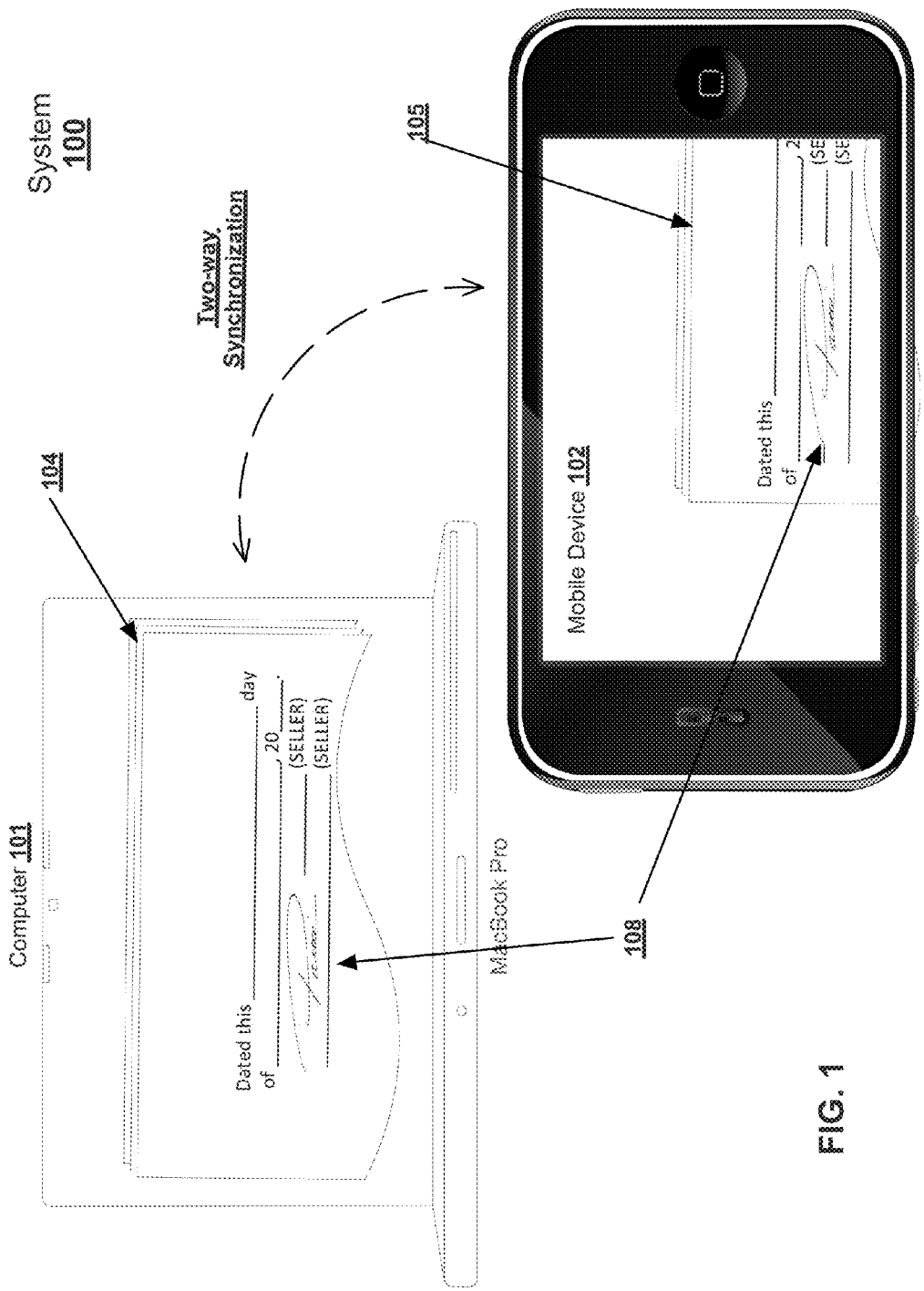
FIG. 1 depicts an example block diagram representation of an embodiment of a system for synchronizing and editing electronic documents on a mobile electronic device.

Throughout the description, for the purposes of explanation, numerous specific details are set forth in order to provide a thorough understanding of the present invention. It will be apparent to one skilled in the art, however, that the present invention may be practiced without some of these specific details. In other instances, well-known structures and devices are shown in block diagram form to avoid obscuring the underlying principles of embodiments of the invention.

Despite the difficulty in finding a digital replacement for the hand-written signature, there is still a great need to enable legal and business work to be conducted remotely using online resources. It has long been recognized that a system is needed for embedding a written signature into a secure electronic document in a digitized form while retaining all the benefits of a real world legal signature on a paper document. Obtaining written signatures is often an everyday part of business and legal work. Embedding a written signature into a secure electronic document in a digitized format can allow all of the unique benefits of a written signature to be retained while enabling signed documents to be simply and easily electronically transmitted between remote locations. The techniques described herein overcome the problems with prior art methods for signing electronic documents. The flow of other solutions to signing electronic documents is non-congruent versus the intuitive and congruent solution provided by the embodiments described herein.

An "electronic signature", or "e-signature", is any electronic means that indicates either that a person adopts the contents of an electronic message, or more broadly that the person who claims to have written a message is the one who wrote it and that the message received is the one that was sent by this person. In commerce and the law, a signature on a document is an indication that the person adopts the intentions recorded in the document. By comparison, a digital signature is a mathematical scheme for demonstrating the authenticity of a digital message or document. A valid digital signature gives a recipient reason to believe that the message was created by a known sender such that the sender cannot deny having sent the message and that the message was not altered in transit. Digital signatures are commonly used for software distribution, financial transactions, and in other cases where it is important to detect forgery or tampering. Digital signatures are often used to implement electronic signatures, a broader term that refers to any electronic data that carries the intent of a signature, but not all electronic signatures use digital signatures.

Unless otherwise indicated, embodiments are not limited to signing electronic documents only, but also include any edits made to an electronic document using a mobile device that is synchronized according to the techniques described herein. Markups, written comments, or notes, for example, can be written into the electronic documents as well. In addition, although at least certain embodiments include a signature field for signature by a signer, other embodiments do not require one. The embodiments described herein afford users with the opportunity to make any handwritten edits to a shared electronic document at any location within the viewable area of the electronic document.

An improved method and system is provided for synchronizing and signing electronic documents displayed in a first data processing device with a second data processing device so that electronic documents can be signed, edited, or otherwise manipulated by a signer of the second device, or multiple electronic devices synchronized together to a same electronic document. The first data processing device can be a computer system at a user's home or office used, or it can be a remote third-party signer's computer system that originated the electronic document. The edits to the electronic document made at the signer's mobile device can be synchronized with the electronic document on the computer transparently to the mobile device. The second data processing device can be any mobile electronic device, including, preferably, a smartphone or equivalent device with a touch screen user input. For instance, the device used for signing the electronic document can be any mobile data processing device such as an iPhone, Android phone, iPad, tablet, laptop PC or Macintosh computer, or any equivalents thereof.

Embodiments are not limited to any particular user device, but the preferred embodiment is a user mobile device with a mechanism to facilitate a handwritten signature of the signer, whether that signature be entered using a touch screen or future device with equivalent functionality. The signer needs only be able to provide a hand-written signature using a finger, stylus, or equivalent device. In addition, embodiments described herein are not limited to any particular technology such as touch screen technology as users of the system could manipulate electronic documents by typing into a keypad, using electronic microphone technology to dictate the edits, or other user input mechanism to edit the electronic document from the mobile device.

The embodiments described herein provide for a real-world signing experience and ease of use on any mobile electronic device. In one example, the embodiments described herein allow an electronic document to be downloaded and concurrently displayed on the computer system and mobile device, or multiple computer systems and/or mobile devices. The electronic document can then be signed using the touch screen of a mobile device. Edits to the electronic document on the mobile device can be communicated to the computer system transparently from the mobile device perspective. The novel architecture described herein is adapted to facilitate synchronization between the computer system and mobile device, or multiple computer systems and/or mobile devices. Each signer can navigate through the electronic document and manipulate it, such as for example, zoom in and out of regions of the document, using the touch screen or other input of the signer's mobile device. Changes made at the mobile device are visible in real time on the computer screen and vice-versa, serving to merge the two devices into one extended system for sharing and editing documents. In addition, the time, location, and edit information can be embedded into the electronic document that is merged across the multiple devices. This information can later be used for authentication of users and validation of their handwritten electronic signatures or other edits.

In one embodiment, two-way synchronization between devices is accomplished over a network using an electronic communication module such as a websocket that maintains an open communication channel between the computer system and the mobile device. The electronic communication module can be located on the computer system or the mobile device, or on both systems. In this embodiment, edits made to the electronic document at the mobile device are communicated to the computer system and applied by a web application running on the computer system in real time transparently to the mobile device. In other embodiments, an application stored on the signer's mobile device can be used to implement the techniques described herein. In yet other embodiments, a direct connection can be established between the signer's mobile device and the computer system. The direct connection can be, for example, a Bluetooth connection, an optic port connection, a WiFi connection, a wired connection, etc. The embodiments described herein are not limited to any particular type of connection or network between the computer system and the mobile device, or among the multiple synchronized devices.

The electronic documents to be signed can be pre-loaded onto a data processing device and a second data processing device. In one embodiment, the electronic document is pre-loaded onto both devices concurrently. In another embodiment, the electronic document can be streamed into each of the devices as an application is opened on the device.

The electronic document can then be displayed on both devices and synchronized therebetween. In a preferred embodiment, the second data processing device is a mobile device with a touch screen user input such as a smartphone or tablet device. Edits to an electronic document performed on the signer's mobile device are applied to the electronic document on the data processing system as the signer is making them in real-time or near real-time. Note this is also true in the reverse: edits made on the computer system appear in the display of the mobile device in real time. This provides a better user experience and more closely mimics the real world act of signing electronic documents in the presence of one or more witnesses.

In other embodiments, there may be a slight delay depending on various circumstances such as the type of network, and the latency and bandwidth thereof, used to synchronize the data processing device with the mobile device. As used herein, the term "real-time" or "near real-time" relates to real-time computing systems that are subject to a real-time constraint such as the operational time period from the occurrence of an event until the system's response to that event. Real-time systems can generally be configured to guarantee response times within a predetermined time constraint. Real-time responses are often understood to be in the order of milliseconds and sometimes microseconds. Conversely, a system without real-time capabilities generally cannot guarantee a response time.

The electronic document pre-loaded on both devices is displayed in a display of the mobile device and can contain one or more signature fields to be signed by the signer. In other embodiments, no signature field is provided as users can make edits directly into any location of the electronic document. The mobile device can be configured to receive a handwritten signature from the signer within the signature field of the electronic document using a signature capture device such as a touch screen configured to simulate experience of signing paper documents. Signature data associated with the handwritten signature is captured as the signature written onto the signature capture device by the signer to facilitate two-way synchronization between the data processing device and the mobile device. The signature data can include a series of graphical objects. For example, in at least certain embodiments, microbursts of signature objects can be received at the signature capture device and synchronized with both devices in real time as the signer is making edits to the electronic document. The signature data can also be aggregated in a buffer in the mobile device and communicated to the data processing device in real time such that edits to the electronic document made at the mobile device are simultaneously reflected in a display of the electronic document on the data processing device, and vice versa. In addition, vector data can be provided on top of the signature data being saved to facilitate a better user experience.

In this way, the mobile device and the data processing system function as one extended system. The mobile device essentially becomes an additional input device to the data processing device it is synchronized with. Several people can collaborate on the same electronic document at the same time, for example, each adding their respective signatures or other edits to the document simultaneously. The data processing device and a mobile device(s) can be synchronized with the electronic document such that edits to the electronic document made at the data processing device are reflected in real time in a display of the electronic document on the mobile device(s) and edits to the electronic document on the mobile device(s) are reflected in real time in a display of the data processing device. The electronic document is merged across the synchronized devices such that edits applied to the electronic by users are visible to the other users in real time in the display screens of their devices.

In addition, several users can navigate and edit a single electronic document at the same time, and the other users can witness the edits on their respective devices. In one embodiment, one of the users can control which page of the document is visible to the other users at a particular time. In other embodiments, all users determine which page to view at a particular time. In this manner, several mobile devices can be synchronized to the same document merged across all the devices. Then a first user can add his or her signature in a first location in real time, a second user can add his or her signature at a second location in real time, and so forth. In addition, both the first and second users can witness each other signing the electronic document. This mimics real world signing of paper documents in the presence of witnesses and can be used to validate electronic signatures.

Multifactor authentication data can be associated with the signer's handwritten signature. The handwritten signature of the signer can be authenticated based at least in part on the multifactor authentication data. The multifactor authentication data can include a time and/or date stamp when the signature data associated with the handwritten signature was generated, geolocation data associated with the location of the signer when the signature data was generated, mobile device phone number, device ID, IP address, MAC address, time stamp, date stamp, biometric data including fingerprint sensor data, or other forensically identifiable parameters captured from the signer's hand movements during the actual signing of the electronic document such as hand acceleration, speed, and rhythm, etc. This information can be used to correlate the handwritten signature to a particular electronic document and to a particular person signing the document. Other digital footprint data or biometric can be used.

A security level can be set as desired for each particular document signed using the system. For example, the originator of the electronic document to be signed can set the security of the electronic document to a desired level for authenticating the handwritten signature. The amount of multifactor authentication data required to authenticate a handwritten signature can be determined, at least in part, by the security level selected. The signer's mobile device telephone number can be used as part of the multifactor authentication data. People generally hold telephone numbers as somewhat secure personal data. The signer's phone number can be entered into the web application for additional security or it can be obtained directly using the multifactor authentication data from the signer's mobile device.

In one embodiment, the signer's telephone number can be entered by navigating to a website that performs an electronic document signing service. The signer may open up a user account with the service, which will request the signer enter his or her mobile device number to enable use of the signing service. Other embodiments include a "standalone" use of the signing service for signers who do not have an account with a document signing service. In such embodiments, a signer with no account can email a document and carbon copy the document signing service, which invokes the signing service. The signing service can then create a web link, which is sent to the recipient of the email and can be used to sign the document. The executed document can then be returned to both parties. In the standalone use case, this process can be explained via concise slides that prompt the signer to enter their mobile device phone number. Push notification services offered by various companies such as Google or Apple can also be used for the same effect. The system can also facilitate multi-way synchronization when the electronic document to be signed is pre-loaded onto a web server disposed between a data processing device and one or more mobile device(s). In one embodiment, the electronic document can be displayed on the mobile device using a web application running on the data processing device or on a web server coupled between the data processing device and the mobile device. In such an embodiment, a web application running on the web server facilitates the communication and synchronization between the data processing device and the mobile device. In the multi-way synchronization case, the order of synchronization can be form the mobile device to the computer system and the computer system can then be synchronized with the web server. In an alternative embodiment, the computer system can be synchronized with the mobile device and the mobile device can then be synchronized with the web phone server; or any combination of these devices and systems.

In other embodiments, the handwritten signature data can be synchronized with the first data processing device via a direct connection such as a Bluetooth wireless connection, wifi connection, optical link, etc. The updated document can then be saved with the signer's edits to the user's computer or other electronic medium, including saved to a public or private cloud or other network. The edited electronic documents can also be transmitted electronically to other users using well-known technical means.

FIG. 1 depicts an example representation of an embodiment of a system for synchronizing and editing electronic documents on a mobile electronic device. In the illustrated embodiment, system 100 includes a computer 101 that is in two-way synchronization with a signer's mobile device 102. Documents 104 displayed on the computer 101 are also displayed as documents 105 in the signer's mobile device as shown. Further, edits 108 to the document displayed in the user's mobile device 102, such as a signature in this example, are also displayed in the display screen of the computer 101. As discussed above, because the documents are synchronized between the computer 101 and the mobile device 102, edits to the electronic document in the mobile device are accordingly applied to the electronic document in the display screen of the computer 101 in real-time or near real time. In at least certain embodiments, this two-way synchronization can be achieved using a web application running on the user's computer 101 that is in communication with an electronic communication module, such as a websocket.

Figure 2:
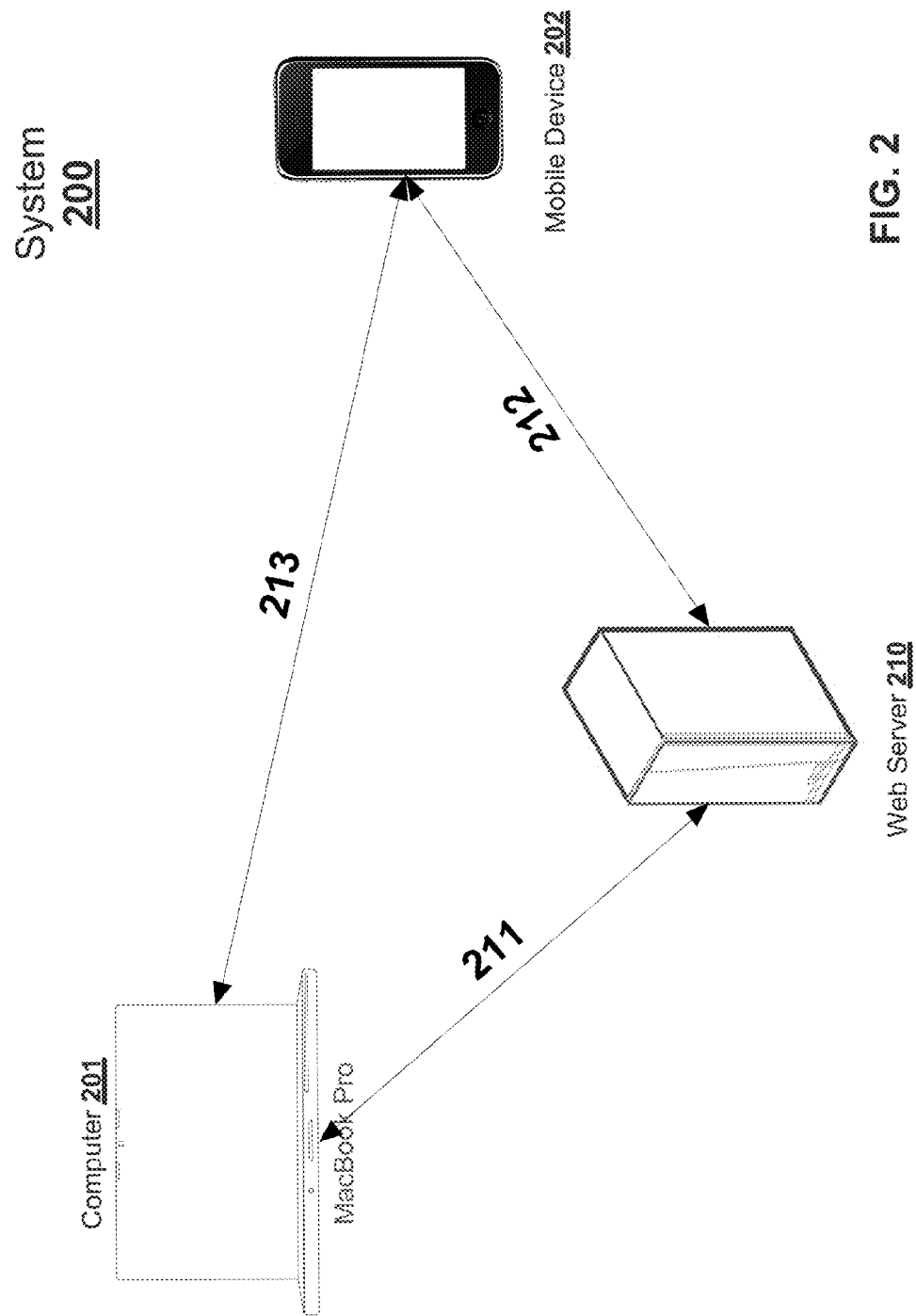
FIG. 2 depicts an example block diagram of an embodiment of a system for synchronizing and editing electronic documents on a mobile device.

FIG. 2 depicts an example block diagram of an embodiment of a system for synchronizing electronic documents on a mobile device via a web server. In the illustrated embodiment, system 200 includes a computer 201 in communication with a signer's mobile device 202 via a web server 210. This facilitates two-way communication based on synchronizing the computer 201 with the mobile device 202 according to the techniques described herein. In addition, the synchronization functions in both directions. Data 211 transmitted from the computer 201 is relayed to the mobile device 202 via the web server 210; likewise, data 212 transmitted from the mobile device 202 is relayed to the computer 201 via the web server.

A web application (not shown) running on the computer 201 can create a secure channel with the mobile device 202 of the signer using a websocket. A websocket protocol is an independent transmission control protocol ("TCP") based protocol that provides full-duplex communications channels over a single TCP connection. Websockets are designed to be implemented in web browsers and web servers, but can also be used by a client or server application. The "WebSocket" protocol makes possible more interaction between a web browser and a web site, facilitating communication of real-time content. This is made possible by providing a standardized way for web servers to send content to the web browser without first being solicited by the client, which allows for messages to be passed back and forth transparently to the client while keeping the connection open. The web page on the computer system stays open. In this way a two-way (bi-directional) ongoing conversation can take place between a web browser and web server. A mobile application running on the signer's mobile device 302 is synchronized with the web browser 315 on the computer 301.

The websocket can include the capability of HTML5 (or equivalent) to permit bidirectional communications between the computer 201 and the HTML5 (or equivalent) capability of a web browser application running on the mobile device 202. The WebSocket specification defines an application-programming interface ("API") establishing "socket" connections between a browser and a web server for full-duplex communications channels over a single TCP socket. Of particular utility here, such a connection is persistent between the client browser and the web server, and either end can start sending data at any time. The WebSocket protocol is currently supported in several browsers including, current versions of Google Chronic, Internet Explorer, Firefox, Safari, and Opera.

Accordingly, embodiments of the web socket can permit bidirectional control of the signature system 200 from either the computer 201 side or the mobile device 202 side. Unlike prior art approaches, such as long polling where an HTTP connection to a server is kept open and poor connectivity can undermine completing transactions, the WebSocket protocol permits one approach to implementing the retry function, and thus helping to ensure that a signature ceremony is completed entirely in one attempt. Other forms of electronic or optical communications, such TCP/IP communications, can be utilized.

However, the embodiments described herein are not limited to use of a websocket. The websocket is a convenient technology but any other protocol for two-way synchronized communications can be utilized. A polling system can also be used to make repeated calls to the same open endpoint. Further, in an alternative embodiment, a direct connection 213 between the computer system 201 and the mobile device 202 is used in lieu of a network connection using a web server. Such an embodiment can include, for example, a Bluetooth, WiFi, optical links, or other direct connection channel. A network is not required for such an embodiment. Alternatively, a network can be present in conjunction with the direct connection as shown in system 200. Any combination of network or direct connections can be utilized.

The data exchanged between the computer 201 and signer's mobile device 202 includes a lot of different pieces of information such as x and y coordinates of the edits made to the electronic document (i.e., the x and y coordinates of a signature graphic), graphical information on the signature graphic, x and y coordinates of a background graphic, global positions system ("GPS") location coordinates of the signer's mobile device and/or computer, user authentication information, mobile device information, web server information, or encryption keys, etc.

Figure 3:
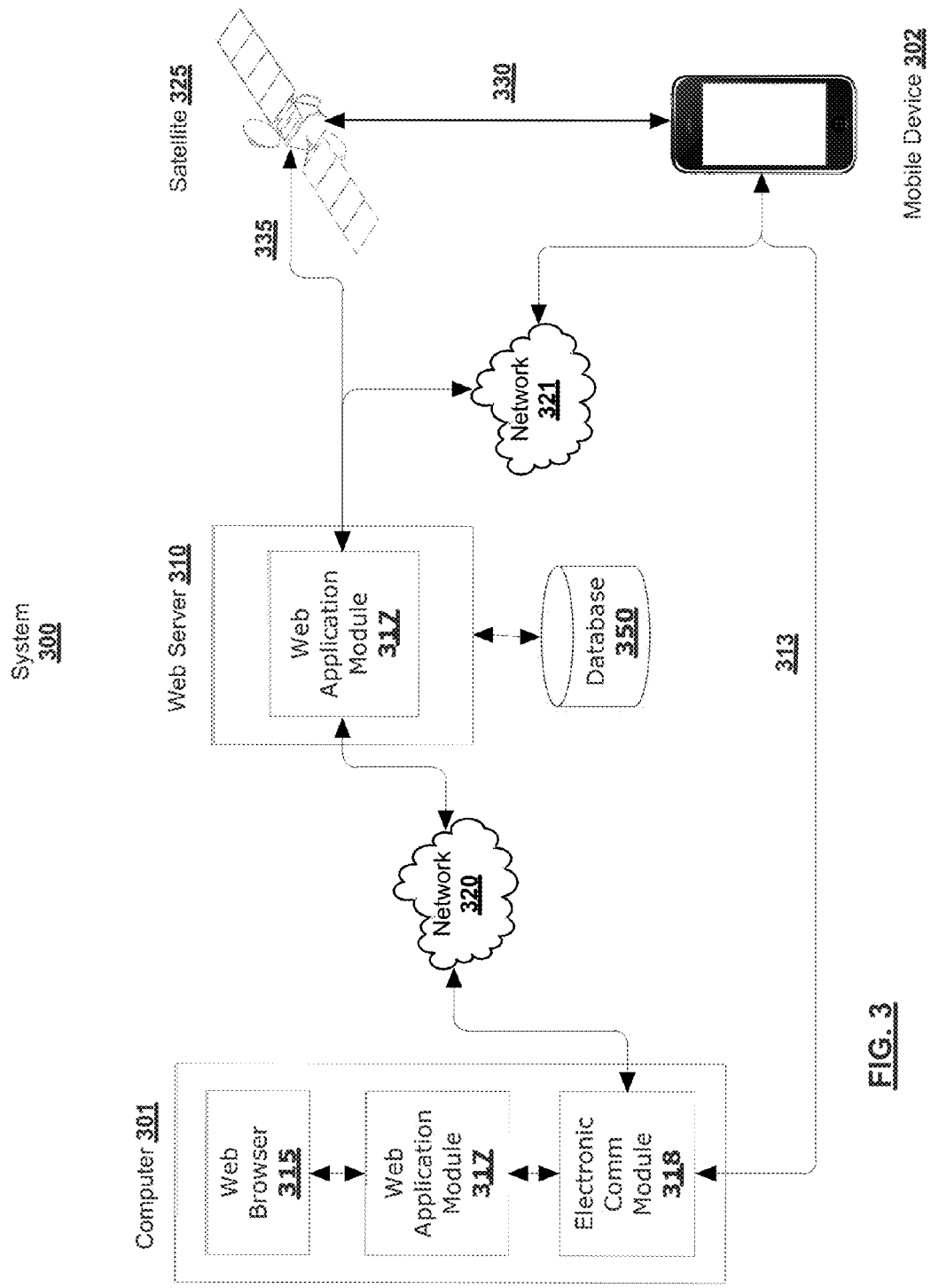
FIG. 3 depicts an example block diagram of a detailed view of an embodiment of a system for synchronizing and editing electronic documents on a mobile device.

FIG. 3 depicts an example block diagram of a detailed view of an embodiment of a system for synchronizing and editing electronic documents on a mobile device. In the illustrated embodiment, system 300 includes a computer 301 that is in two-way synchronization with the signer's mobile device 302 via a web server 310 or via a direct connection 313. This two-way synchronization facilitates synching electronic documents between the computer and mobile device as described above such that edits to the electronic document performed by the user on the mobile device are applied to the electronic document on the computer 301 in real-time or near real-time. A direct connection 313 can also be used in lieu of or in addition to a network connection as discussed above.

To accomplish this two-way synchronization, computer 301 includes a web application module 317 running in a web browser 315 as well as on the web server 310. An electronic communications module 318 can be launched for communications with a mobile application running on the signer's mobile device 302 via the web server 310 coupled with a database 350. Whenever a click, or open document, or other event is received and registered in the web browser 315 of computer 301, it is transmitted to the web application module 317 on the web server 310 via the electronic communications module 318. The web server 310 in turn relays the registered events to a mobile application (not shown) running on the signer's mobile device 302. In a preferred embodiment, the electronic communications module 318 is a websocket. This facilitates two-way communications between mobile application module 317 on computer 301 and the mobile application (not shown) running on signer's mobile device 302. The mobile application can be either a web-based mobile application or an application-based mobile application. Other electronic communications well known in the art can be used or new ones developed in the future for this purpose.

In addition, as shown, these communications occur over networks 320 and 321. Networks 320 and 321 can be any wired or wireless networks for passing data between devices. In one embodiment, networks 320 and 321 can be a single network, e.g., the Internet. In other embodiments, networks 320 and 321 can be separate networks. The techniques described herein are not limited to any particular type of network. In addition, as discussed above, a direct connection 313 can be used in lieu of or in addition to a network.

System 300 further includes, in at least one embodiment, connections to one or more satellites 325 for receiving global positioning system ("GPS") data 330 from the mobile device 302. This GPS data can approximate the location of the mobile device 302 within a few feet as is well known and understood in the art. Accordingly, the additional GPS data 330 can further be used for authenticating the mobile device 302 during synchronization for enhanced security and reliability of the system 300. As a result, when a user edits an electronic document with, for example, a signature, the signature can be further authenticated if the mobile device GPS data indicates it is located within a certain geographical area or in the same proximity as the computer 301, for example. System 300 also indicates the detailed logging of the signature process as part of signature authentication. The geolocating and time stamping of each signatures and text markup contribute to the security and forensic capabilities of the invention. Other embodiments do not require GPS data be used as this is only for a preferred embodiment.

Figure 4:
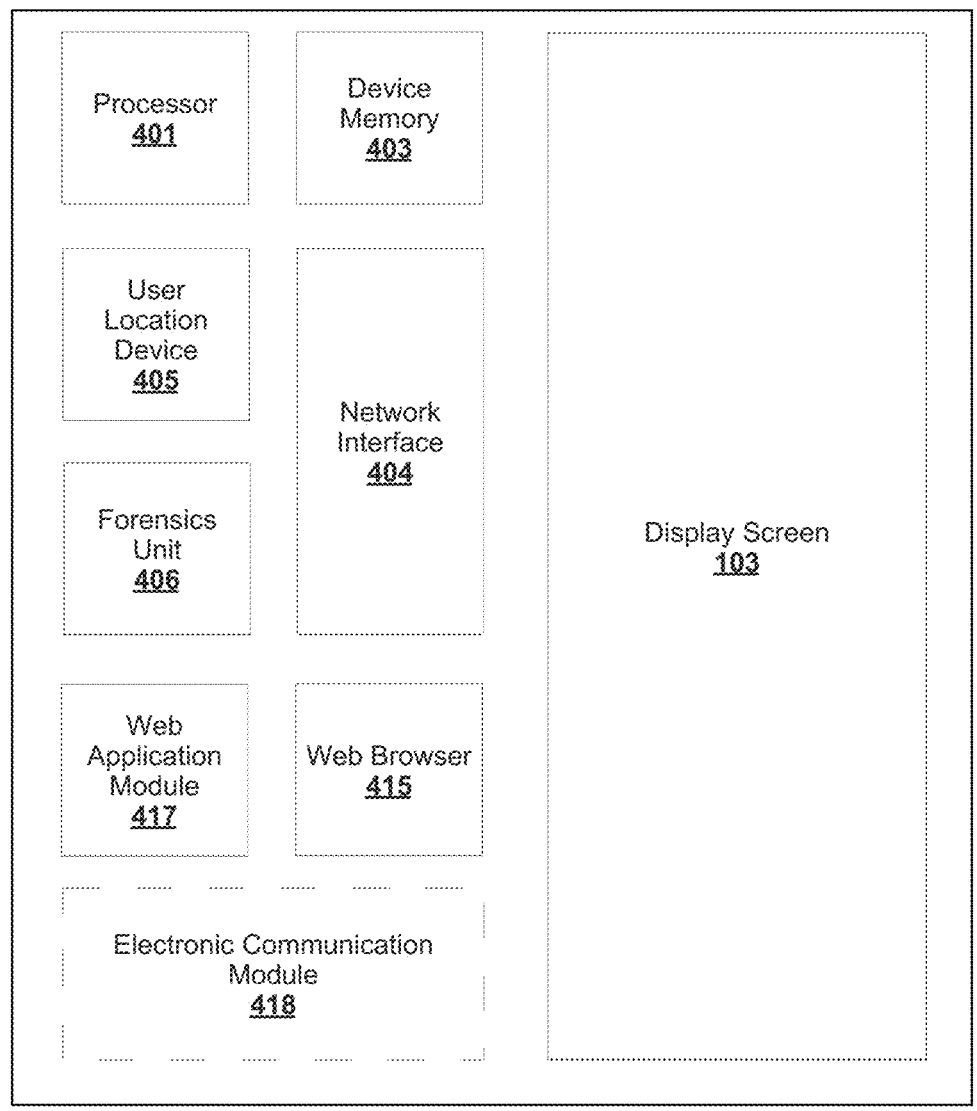
FIG. 4 depicts an example block diagram of an embodiment of a mobile device for synchronizing and editing electronic documents.

FIG. 4 depicts an example block diagram of an embodiment of a mobile device for synchronizing and editing electronic documents. In the illustrated embodiment, the mobile user device 402 includes well-known components of a smartphone or equivalent device including a processor 401, memory device 403, a user location device 405 (such as a GPS device), a web application module 417, a web browser 415, a network interface 404, and a display screen 103. Touch screen technology can be used to capture a handwritten signature of a signer. User device 402 further includes a forensics unit 406 adapted to receive signature data of the signer's handwritten signature and to collect multifactor authentication information therefrom. The forensics unit 406 can associate the multifactor authentication data with the handwritten signature and transmit this information to the synchronized computer system in real time. User device 402 can also optionally include an electronic communications module such as a websocket as discussed above. The forensics unit can also include a fingerprint sensor to associate biometric data with the multifactor authentication data as an additional security layer for authentication. Other biometric sensors can be utilized.

Figure 5A:
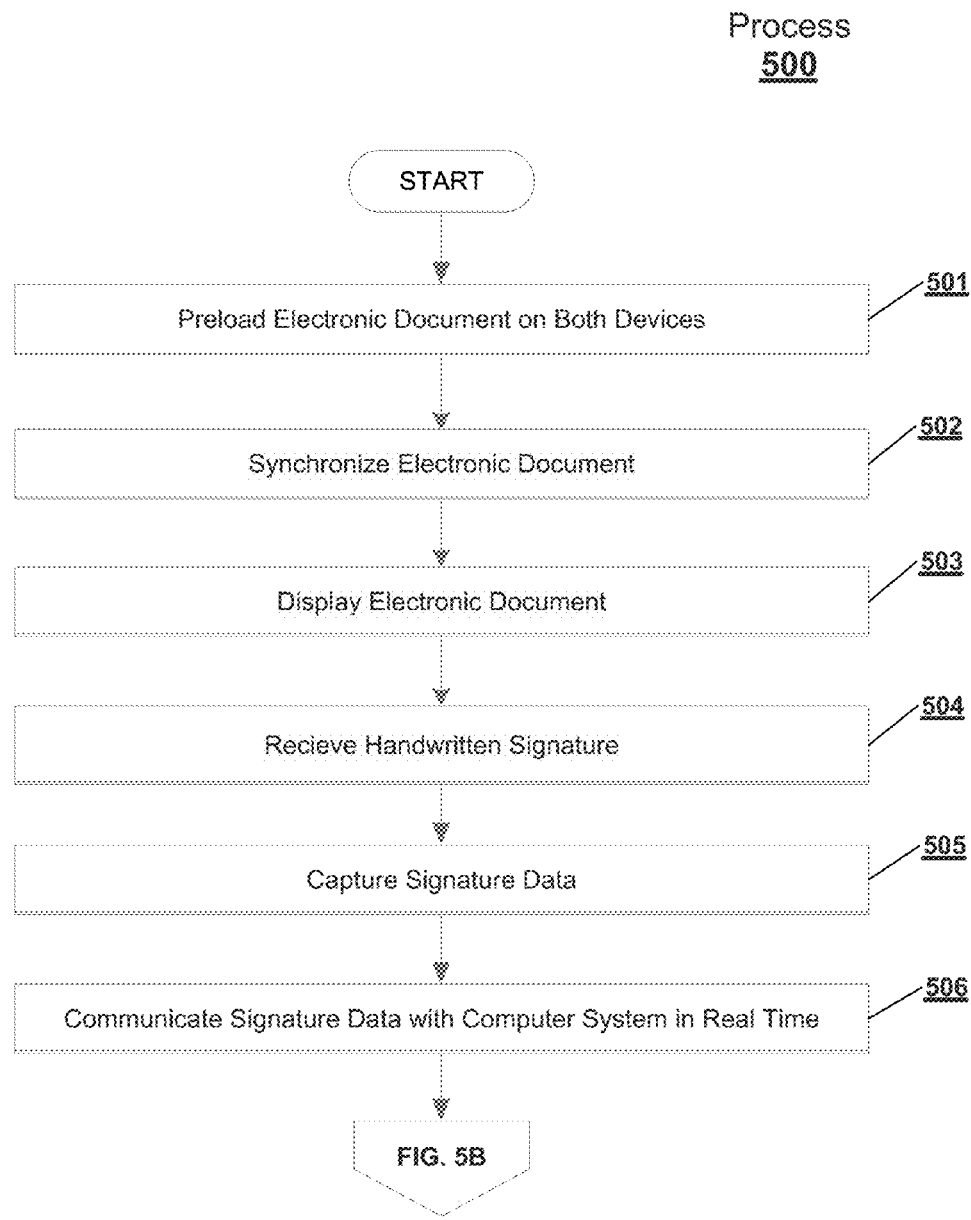
FIG. 5A depicts an example embodiment of a process for synchronizing and editing electronic documents on a mobile device.

FIG. 5A depicts an example embodiment of a process for synchronizing and editing electronic documents on a mobile device. In the illustrated embodiment, process 500 begins at operation 501 where an electronic document is pre-loaded onto a first and second data processing device. In one embodiment, this first data processing device can be a computer such as a desktop PC or a web server and the second data processing device can be a mobile device(s) of one or more signers of the electronic document. In other embodiments, the first device can be a computer system of a remote originator of an electronic document to be signed or otherwise edited. More than one computer system and/or mobile device can also be present in the system. In either case, the embodiments described herein are adapted to facilitate user signing of electronic documents using the singer's mobile device(s), e.g., smartphone. A signer can pull up the electronic document on his or her mobile device and sign it using an input mechanism such as a touch screen.

Process 500 continues at operation 502 by synchronizing the electronic document pre-loaded onto the first data processing device with the electronic document pre-loaded onto the signer's mobile device(s) such that user edits to the electronic document made at the second data processing device are simultaneously reflected in the display of the electronic document on the first data processing device. That is, the first data processing device and one or more mobile device(s) can be synchronized with a merged electronic document such that edits to the electronic document made at the first data processing device are reflected in real time in a display of the electronic document on the mobile device(s) and edits to the electronic document on one or more of the mobile devices are reflected in real time in a display of the first data processing device. The synchronized electronic document is displayed in a display of the mobile device(s) (operation 503). The electronic document can optionally contain a signature field to be signed using the mobile device(s).

At operation 504, a handwritten signature of the signer is received within a location of the electronic document using a signature capture device (operation 504) and signature data associated with the handwritten signature can be captured as it is being received at the signature capture device (operation 505). In one embodiment, the signature data can be aggregated in a buffer of the signer's mobile device. For instance, the signature data can be aggregated in a buffer in a network interface of the mobile device.

Process 500 continues at operation 506 where the signature data is communicated with the computer system in real time transparently to the mobile device(s). In one embodiment, a mobile application on the signer's mobile device communicates this information with a web application running on the first data processing system or a web server. Process 500 continues on FIG. 5B.

Figure 5B:
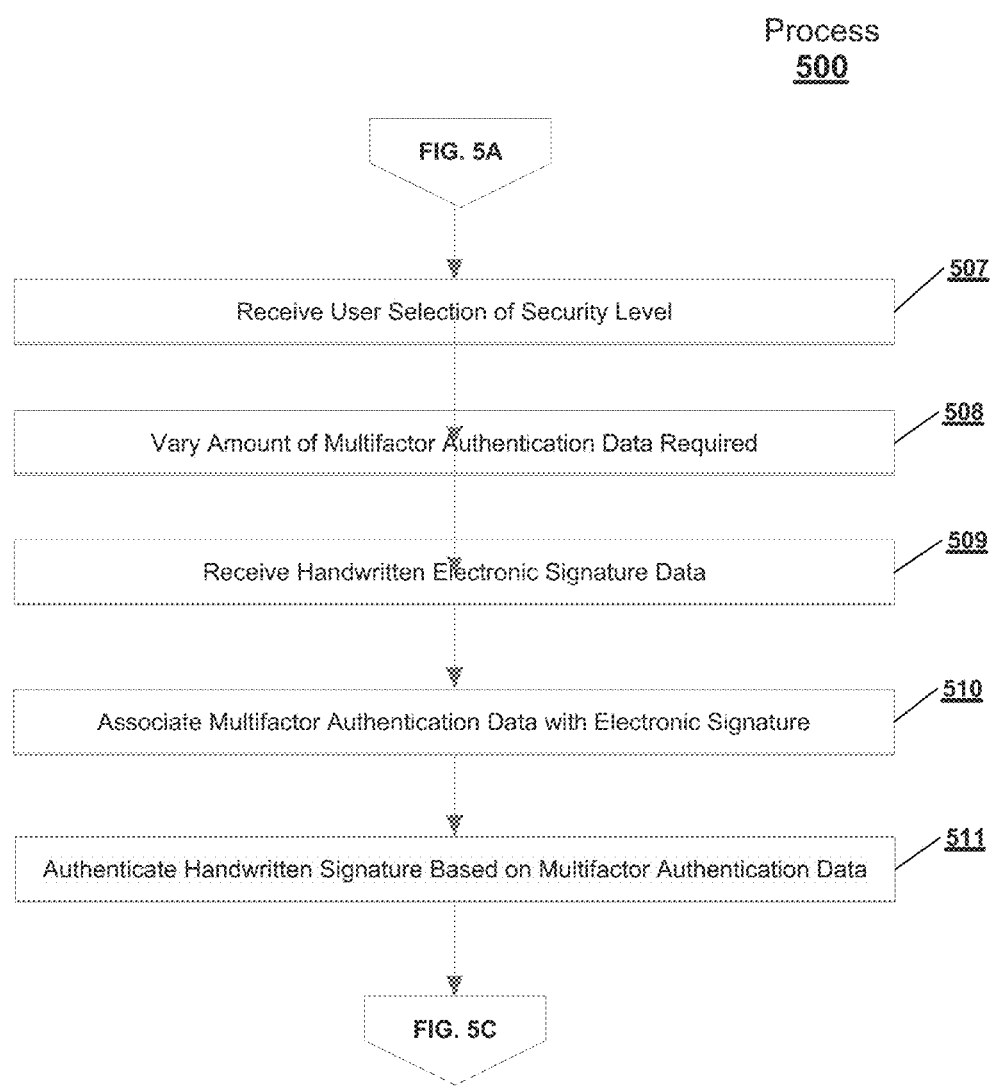
FIG. 5B depicts an example embodiment of a process for synchronizing and editing electronic documents on a mobile device.

FIG. 5B depicts an example embodiment of a process for synchronizing and editing electronic documents on a mobile device. In the illustrated embodiment, process 500 continues at operation 507 where a user selection of a level of security desired for authentication of the handwritten signature on the electronic document can also be made and received by the system. The system can then vary the amount of multifactor authentication data required for authenticating the handwritten signature based on the selected level of security (operation 508). The higher the desired level of security, the more multifactor authentication data can be required to authenticate the signature. For example, if a high level of security is required, such as for a document requiring notarization, the system can require several items of multifactor authentication data to authenticate the user. The multifactor authentication data can include one or more of a time stamp, a date stamp, and geolocation data associated with the user. For instance, the system can require the user to sign on a particular time, on a particular date, and at a particular location. Other multifactor identification can also be required such as mobile device telephone number, user device ID, IP address, certain handwriting forensics, etc. The multifactor authentication data can then be received during the handwriting of the signer's signature (operation 509) and associated with the handwritten signature data (operation 510). The handwritten signature can then be authenticated based at least in part on the multifactor authentication data (operation 511). Process 500 continues on FIG. 5C.

Figure 5C:
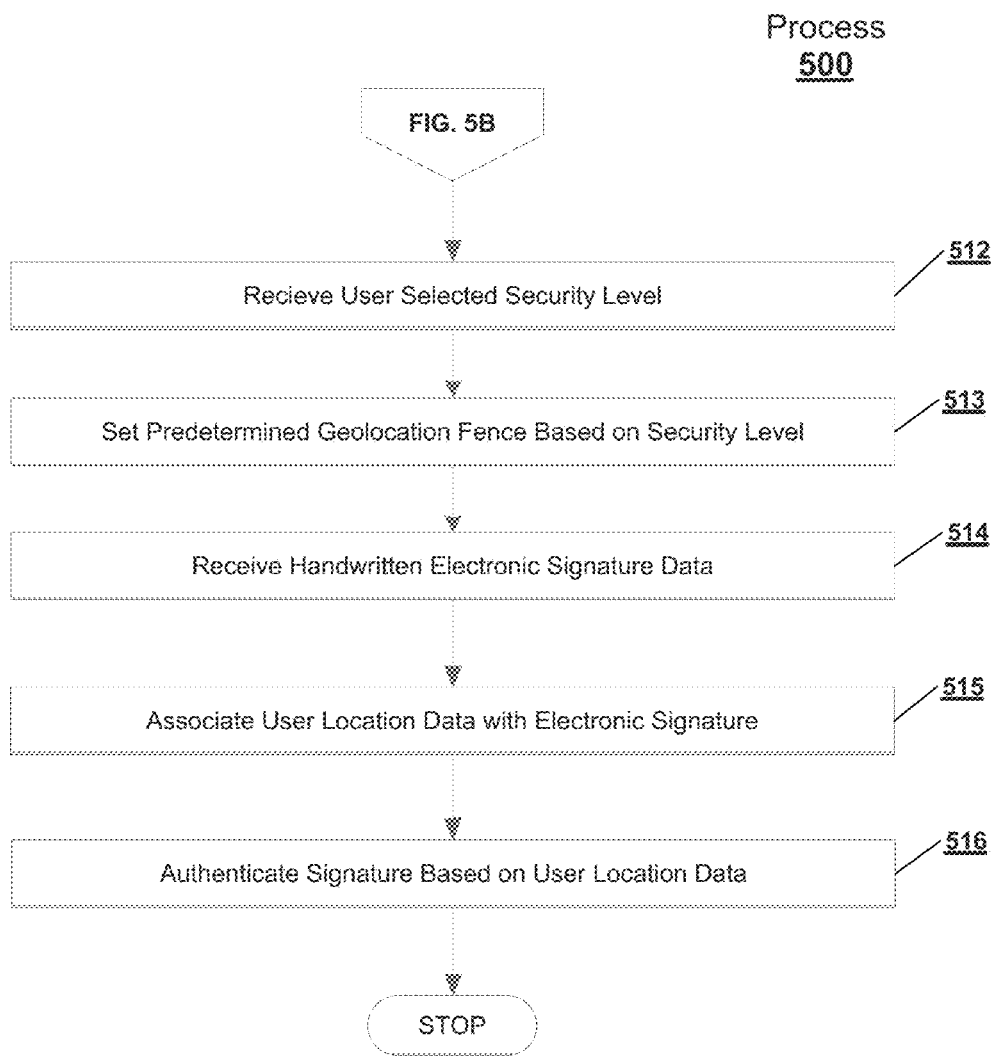
FIG. 5C depicts an example embodiment of a process for synchronizing and editing electronic documents on a mobile device.

FIG. 5C depicts an example embodiment of a process for synchronizing and editing electronic documents on a mobile device. In the illustrated embodiment, process 500 continues at operation 512 where a user selection of a security level for authenticating the handwritten signature on the electronic document is received by the system. The system can then set a geolocation fence required for authenticating the handwritten signature based on the selected level of security (operation 513). A predetermined geolocation fence can be set as a requirement for security and validity of the handwritten electronic signature. A geolocation fence is a specific location or area in which a signer must sign the electronic document for it to be considered valid. For example, the electronic document may be required to be signed at a signer's office or in a particular state or country, etc.

The handwritten electronic signature data can then be received at the mobile device(s) during the writing of the signer's signature (operation 514) and the user location data can be associated therewith (operation 515). The handwritten signature can then be authenticated or validity based at least in part on the user location data (operation 516). In addition, the geographic location of the signer can be displayed using a mapping application such as Google Maps. The geographic location of the signer can also be displayed in proximity to the handwritten signature on the electronic document using a mapping application such Google Maps. The map location can be displayed next to the signature field of the electronic document or a link can be provided to the map location. Alternatively, a pop-up window displaying the signer's location on a map can be invoked when a user cursors over the signature using an input device such as a mouse. This completes process 500 according to one example embodiment. In at least certain embodiments, users can select the documents to be downloaded and signed using the systems and methods described herein. One or more electronic documents can be imported into the document signing service website from a user's computer, or the electronic documents can chosen from a pre-existing list and imported directly from the document signing service website; or the electronic document(s) can be provided by another user via email in the standalone use case, or by upload, or via a web storage service such as Box or DropBox, or by sending the document by text message, or from Icloud, or from an online URL, etc.

The electronic document can be supplied as an image file such as a PDF file and displayed in a web browser on the user's computer system. An electronic communications module, such as a WebSocket, can then be launched to enable two-way synchronization with between the user's computer and mobile device. A web application module on the user's computer can then transmit an executable link to the user's mobile device via the websocket and/or intervening web server. The Web Uniform Resource Locator ("URL"), custom URL scheme, or other executable link can be selected to launch a signing service mobile application on the user's mobile device. As discussed above, the mobile application can be a web-based or application-based mobile application. In at least one embodiment, the executable link is sent via a text message (SMS or MMS), but other embodiments are possible as the invention is not so limited. For instance, push notifications could be used, as well as any other current or future form of electronic messaging, including in application messaging both to the user and to the mobile application.

As discussed above, the web application module running on the web browser of the computer system and/or the web server relays all clicks, open documents, or other registered events to the web server via an electronic communications module such as a websocket. The user selected electronic document is displayed in the mobile device display screen in the same way it is displayed in the display screen of the user's computer. The user can navigate around the electronic document in the display screen of the user's computer and sign or otherwise edit the electronic document on the mobile device display using touch screen technology commonly provided on most modern mobile devices as is well known in the art. Users can also add a signature, type, or check a box in the document displayed on the mobile device screen as desired, which edits are displayed at the appropriate location in the document on the user's device as the user is making them.

The embodiments described herein include a method and system for synching with and editing electronic documents in real-time or near real-time using a second electronic device. The various data processing devices and systems are provided for illustrative purposes only, and are not intended to represent any particular architecture or manner of interconnecting the components, as such details are not germane to the techniques described herein. It will be appreciated that network computers and other data processing systems, which have fewer components or perhaps more components, may also be used.

For instance, these embodiments may be practiced with a wide range of computer system configurations including any device that can interact with the Internet via a web browser such as hand-held devices, microprocessor systems, workstations, personal computers (PCs), Apple Macintosh computers, programmable consumer electronics, minicomputers, mainframe computers, or any other mobile communications device such as a iPhone, iPad, Android device, or Blackberry, or any device having similar functionality. These embodiments can also be practiced in distributed computing environments where tasks are performed by remote processing devices that are linked through a wire-based or wireless network.

Figure 6:
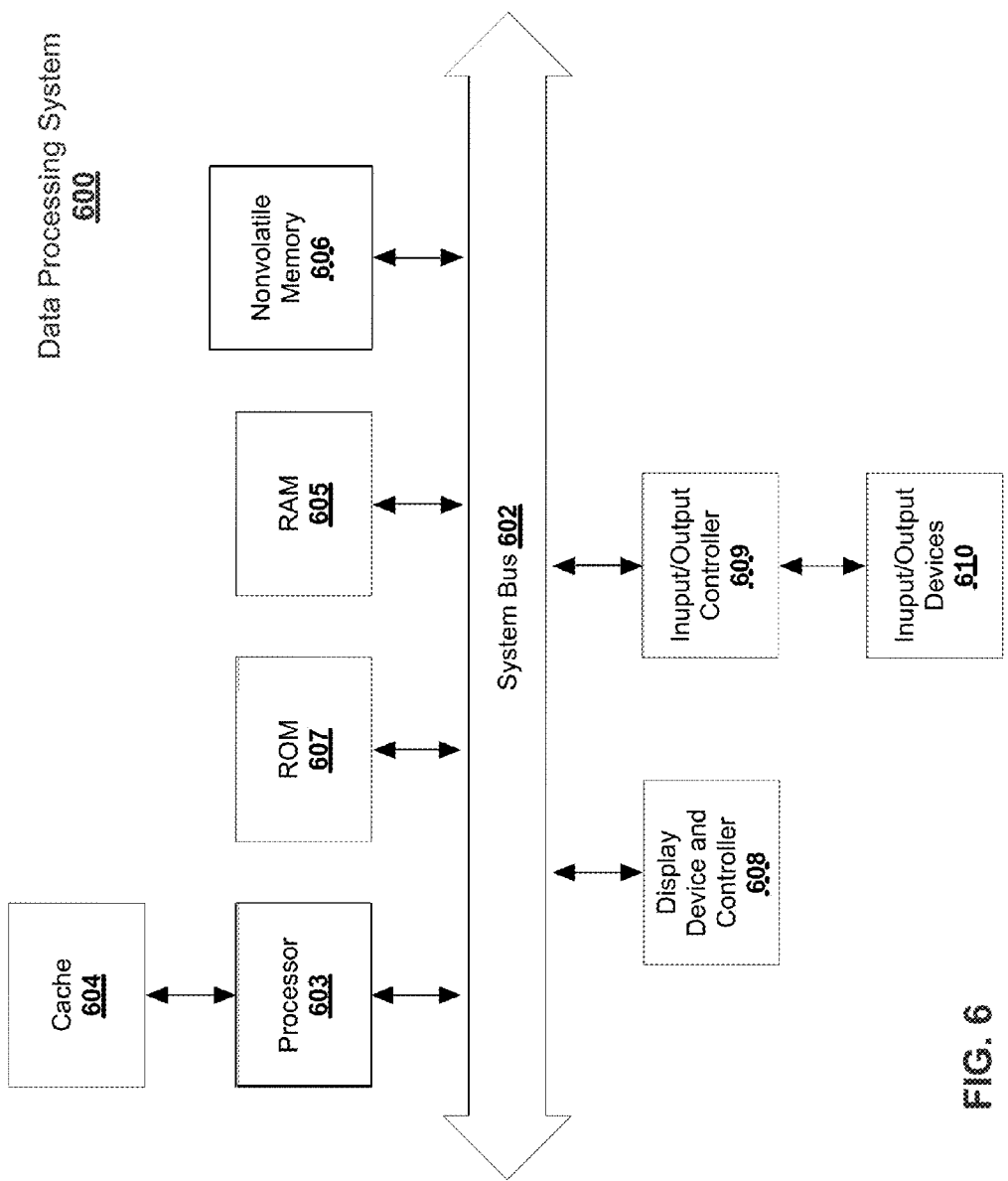
FIG. 6 depicts an example data processing system upon which the embodiments described herein may be implemented.

FIG. 6 depicts an example data processing system upon which the embodiments described herein may be implemented. As shown in FIG. 6, the data processing system 601 includes a system bus 602, which is coupled to a processor 603, a Read-Only Memory ("ROM") 607, a Random Access Memory ("RAM") 605, as well as other nonvolatile memory 606, e.g., a hard drive. In the illustrated embodiment, processor 603 is coupled to a cache memory 604. System bus 602 can be adapted to interconnect these various components together and also interconnect components 603, 607, 605, and 606 to a display controller and display device 608, and to peripheral devices such as input/output ("I/O") devices 610. Types of I/O devices can include keyboards, modems, network interfaces, printers, scanners, video cameras, or other devices well known in the art. Typically, I/O devices 610 are coupled to the system bus 602 through I/O controllers 609. In one embodiment the I/O controller 609 includes a Universal Serial Bus ("USB") adapter for controlling USB peripherals or other type of bus adapter.

RAM 605 can be implemented as dynamic RAM ("DRAM"), which requires power continually in order to refresh or maintain the data in the memory. The other nonvolatile memory 606 can be a magnetic hard drive, magnetic optical drive, optical drive, DVD RAM, or other type of memory system that maintains data after power is removed from the system. While FIG. 6 shows that nonvolatile memory 606 as a local device coupled with the rest of the components in the data processing system, it will be appreciated by skilled artisans that the described techniques may use a nonvolatile memory remote from the system, such as a network storage device coupled with the data processing system through a network interface such as a modem or Ethernet interface (not shown).

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory. In various embodiments, hard-wired circuitry may be used independently or in combination with software instructions to implement these techniques. For instance, the described functionality may be performed by specific hardware components containing hardwired logic for performing operations, or by any combination of custom hardware components and programmed computer components. The techniques described herein are not limited to any specific combination of hardware circuitry and software.

Embodiments herein may also be implemented in computer-readable instructions stored on an article of manufacture referred to as a computer-readable medium, which is adapted to store data that can thereafter be read and processed by a computer. Computer-readable media is adapted to store these computer instructions, which when executed by a computer or other data processing system such as data processing system 600, are adapted to cause the system to perform operations according to the techniques described herein. Computer-readable media can include any mechanism that stores information in a form accessible by a data processing device such as a computer, network device, tablet, smartphone, or any device having similar functionality. Examples of computer-readable media include any type of tangible article of manufacture capable of storing information thereon including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing instructions in an electronic format. Computer-readable media can also be distributed over a network-coupled computer system stored and executed in a distributed fashion.

Throughout the foregoing description, for the purposes of explanation, numerous specific details were set forth in order to provide a thorough understanding of the invention. It will be apparent, however, to persons skilled in the art that these embodiments may be practiced without some of these specific details. Accordingly, the scope and spirit of the invention should be judged in terms of the claims that follow as well as the legal equivalents thereof.

What is claimed is:

1. A method of editing an electronic document comprising:
    synchronizing a first data processing device and a second data processing device with an electronic document using a communications module that maintains an open communications channel between the first and second data processing devices such that edits to the electronic document made at the first data processing device are reflected in real time in a display of the electronic document on the second data processing device and edits to the electronic document on the second data processing device are reflected in real time in a display of the first data processing device, wherein the edits to the electronic document are passed back and forth through the open communications channel transparently to the first and second data processing devices;
    receiving a handwritten signature of a signer at a location within the electronic document at the second data processing device;
    capturing signature data of the handwritten signature using a signature capture device, wherein the signature data is captured as signature objects synchronized with the first and second data processing devices as the signer is making edits to the electronic document;
    receiving a selection of a security level for the electronic document and varying an amount of multifactor authentication data required for authenticating the handwritten signature based on the selected security level;
    setting a predetermined geolocation fence and requiring the signer to sign the electronic document at a location within the geolocation fence for the handwritten signature to be valid; and
    communicating the signature data from the second data processing device to the first data processing device in real time as the signature data is being captured at the signature capture device.

2. The method of claim 1 wherein the electronic document is merged across the first and second data processing devices to permit a same or different page of the electronic document to be viewed and edited in the display of the first data processing device and the display of the second data processing device.

3. The method of claim 1 further comprising synchronizing the electronic document with a third data processing device such that edits to the electronic document made at any one of the first, second or third data processing devices are reflected in real time on displays of the other ones of the first, second and third data processing devices.

4. The method of claim 1 further comprising pre-loading the electronic document to be signed concurrently onto a first data processing device and a second data processing device.

5. The method of claim 1 wherein the second data processing device is a mobile device.

6. The method of claim 5 wherein the signature capture device includes a touch screen of the mobile device.

7. The method of claim 1 further comprising:
    associating multifactor authentication data with the signature data of the handwritten signature
of the signer; and
    authenticating the handwritten signature of the signer based at least in part on the multifactor authentication data.

8. The method of claim 7 wherein the multifactor authentication data includes all of (1) a time stamp, (2) a telephone number, and (3) geolocation data associated with the signer.

9. The method of claim 1 further comprising:
associating multifactor authentication data with the signature data of the handwritten signature of the signer; and
correlating the handwritten signature to both the electronic document and to the signer based at least in part on the multifactor authentication data.

10. A method of editing an electronic document comprising:
synchronizing a first data processing device and a second data processing device with an electronic document such that edits to the electronic document made at the first data processing device are reflected in real time in a display of the electronic document on the second data processing device and edits to the electronic document on the second data processing device are reflected in real time in a display of the first data processing device;
receiving a handwritten signature of a signer at a location within the electronic document at the second data processing device;
capturing signature data of the handwritten signature using a signature capture device;
communicating the signature data from the second data processing device to the first data processing device in real time as the signature data is being captured at the signature capture device;
setting a predetermined geolocation fence and requiring the signer to sign the electronic document at a location within the geolocation fence for the handwritten signature to be valid; and
receiving a selection of a security level for the electronic document; and
varying an amount of multifactor authentication data required for authenticating the handwritten signature based on the selected security level.

11. A method of editing an electronic document comprising:
synchronizing a first data processing device and a second data processing device with an electronic document such that edits to the electronic document made at the first data processing device are reflected in real time in a display of the electronic document on the second data processing device and edits to the electronic document on the second data processing device are reflected in real time in a display of the first data processing device;
receiving a handwritten signature of a signer at a location within the electronic document at the second data processing device;
capturing signature data of the handwritten signature using a signature capture device;
communicating the signature data from the second data processing device to the first data processing device in real time as the signature data is being captured at the signature capture device;
receiving a selection of a security level for the electronic document and varying an amount of multifactor authentication data required for authenticating the handwritten signature based on the selected security level;
setting a predetermined geolocation fence as a requirement for security; and
requiring the signer to sign the electronic document at a location within the geolocation fence for the handwritten signature to be valid.

12. A mobile device configured for editing an electronic document comprising:
a processing unit;
a memory operatively coupled with the processing unit via an interconnect;
a synchronization module configured to synchronize with an electronic document stored on a data processing system using a communications module that maintains an open communications channel between the data processing system and the mobile device such that edits to the electronic document made at the data processing system are reflected in real time in a display of the electronic document on the mobile device and edits to the electronic document on the mobile device are reflected in real time in a display of the data processing system, wherein the edits to the electronic document are passed back and forth through the open communications channel transparently to the data processing system and the mobile device;
a signature capture device adapted to capture signature data of a handwritten signature of a signer at a location within the electronic document displayed on the mobile device, wherein the signature data is captured as signature objects synchronized with the data processing system and the mobile device as the signer is making edits to the electronic document;
a forensics component configured to receive a selection of a security level for the electronic document and to vary multifactor authentication data required for authenticating the handwritten signature based on the selected security level;
a location component configured to set a predetermined geolocation fence and to require the signer to sign the electronic document at a location within the geolocation fence for the handwritten signature to be valid; and
a communication unit configured to communicate the signature data from the mobile device to the data processing system in real time as the signature data is being captured at the signature capture device.

13. The mobile device of claim 12 wherein the electronic document is merged across the data processing system and the mobile device to permit a same or different page of the electronic document to be viewed and edited in the display of the data processing system and the display of the mobile device.

14. The mobile device of claim 12 wherein multiple mobile devices are synchronized with the electronic document.

15. The mobile device of claim 12 wherein the electronic document to be signed is pre-loaded concurrently onto the data processing system and the mobile device.

16. The mobile device of claim 12 further comprising a forensics unit configured to:
associate multifactor authentication data with the handwritten signature of the signer; and
authenticate the signature data of the handwritten signature based at least in part on the multifactor authentication data.

17. The mobile device of claim 16 wherein the multifactor authentication data includes all of (1) a time stamp, (2) a telephone number, and (3) geolocation data associated with the signer.

18. The mobile device of claim 12 wherein the signature capture device is further configured to:
associate multifactor authentication data with the signature data of the handwritten signature of the signer; and
correlate the handwritten signature to both the electronic document and to the signer based at least in part on the multifactor authentication data.

* * * * *